(12) United States Patent
Eriksson

(10) Patent No.: US 7,156,429 B2
(45) Date of Patent: Jan. 2, 2007

(54) RETAINER FOR AN OVER-CENTRE FASTENER

(76) Inventor: Lars Eriksson, Hättinge 3445, S-635 05 Eskilstuna (SE)

( * ) Notice: Subject to any disclaimer, the term of this patent is extended or adjusted under 35 U.S.C. 154(b) by 26 days.

(21) Appl. No.: 10/528,354

(22) PCT Filed: Oct. 30, 2003

(86) PCT No.: PCT/SE03/01683

§ 371 (c)(1),
(2), (4) Date: Mar. 18, 2005

(87) PCT Pub. No.: WO2004/040149

PCT Pub. Date: May 13, 2004

(65) Prior Publication Data

US 2006/0163885 A1    Jul. 27, 2006

(30) Foreign Application Priority Data

Oct. 30, 2002  (SE) .................................. 0203194
Oct. 30, 2002  (SE) .................................. 0203196

(51) Int. Cl.
E05C 5/00 (2006.01)

(52) U.S. Cl. ................. 292/247; 292/113; 292/256.69; 292/DIG. 49

(58) Field of Classification Search ................. 292/247, 292/113, 256.69, DIG. 49; 24/71 R, 71 T, 24/71 A, 68 T, 68 SK
See application file for complete search history.

(56) References Cited

U.S. PATENT DOCUMENTS 2,450,694 A    10/1948  Sauer
2,683,051 A *   7/1954  Christophersen ....... 292/256.69
2,829,912 A *   4/1958  Koch ........................ 292/114
3,162,419 A *  12/1964  Blasingame ................ 403/325
3,297,348 A *   1/1967  Griffiths et al. ............. 292/113
3,534,992 A *  10/1970  Swanson .................... 292/113
3,797,547 A *   3/1974  Shinjo ........................ 411/303
3,831,224 A *   8/1974  MacMaster et al. ........ 24/68 T
3,936,082 A *   2/1976  Swanson .................... 292/113
4,019,550 A *   4/1977  DeHaitre .................... 411/303
4,116,479 A *   9/1978  Poe ............................ 292/113
4,126,170 A *  11/1978  DeHaitre .................... 411/303
4,218,081 A *   8/1980  Johnson ....................... 292/66
4,307,906 A *  12/1981  Schenk ...................... 292/247
4,540,206 A *   9/1985  Frame et al. ................. 292/66
4,583,442 A *   4/1986  Minor ......................... 84/413
4,830,413 A *   5/1989  Bisbing ...................... 292/247
5,478,125 A *  12/1995  Gromotka .................... 292/67
5,595,466 A *   1/1997  DeHaitre .................... 411/303
6,076,865 A *   6/2000  Sokurenko et al. ......... 292/113
6,345,846 B1 *  2/2002  DeRees et al. ............. 292/241
6,457,750 B1 * 10/2002  Sokurenko et al. ......... 292/113

FOREIGN PATENT DOCUMENTS

GB    1327389 A    8/1973

* cited by examiner

Primary Examiner—Brian E. Glessner
Assistant Examiner—Carlos Lugo
(74) Attorney, Agent, or Firm—Birch, Stewart, Kolasch & Birch, LLP

(57) ABSTRACT

A retainer for an adjustment device for an over-center fastener for securing and clamping two parts (11, 12) together by applying a pulling force between the parts by a lever (14). The adjustment device includes an externally threaded member (17a) and an internally threaded member (19) rotatable relative to one another. The internally threaded member has a friction increasing insert (24) preventing unintentional relative rotation between the externally threaded member and the internally threaded member.

4 Claims, 4 Drawing Sheets

RETAINER FOR AN OVER-CENTRE FASTENER

BACKGROUND OF THE INVENTION

1. Field of the Invention

The present invention concerns a retainer for an adjustment device of an over-center fastener.

2. Description of the Related Art

Over-center fasteners (also denominated toggle fasteners or latches) are commonly used for securing—and often clamping—two objects together, such as keeping a lid in a closed position on a box or case. A first part of the fastener, referred to as a striker and often having a hook-like shape, is attached to one of the objects. A base member of the other part of the fastener is attached to the other object.

There are two different types of over-center fasteners.

In a first type (see e.g.: http://www.ojop.com/700.htm), a first end of a lever is jointed to the base member so as to be swingable about a first axis. The other end of the lever serves as a handle member. At a distance from the first end, an engagement means is linked to the lever so as to be swingable about a second axis parallel to the first axis. In use, the engagement means is brought into engagement with the first part of the fastener and the handle with the second axis is swung about the first axis to move the engagement means closer to the base member. In order to vary the distance between the second axis and the engagement means, and thereby the engagement force, the engagement means has a threaded stem member engaged in the threads of an internally threaded body member rotatably connected to the lever about the second axis. The body member is normally a cylindrical body rotatable about its axis.

In a second type of over-center fastener (see e.g.: http://www.ojop.com/900.htm), a first end of a link is jointed to the base member so as to be rotatable about a first axis. A second end of the link is jointed to a first end of a handle member. A second end of the handle member is provided with engagement means for engagement with the first part of the fastener. In use, the engagement means is brought into engagement with the first part of the fastener, and the handle member is operated, involving rotation of the second axis about the first one, thereby moving the engagement means closer to the first part. In order to vary the distance between the first and the second axes, the length of the link is variable in that it comprises a threaded stem member engaged in an internally threaded body member connected to the handle and containing the second axis. In this case, the body member is usually formed from folded sheet metal.

In both types of fasteners, there is a desire to prevent undesired relative rotation of the two threaded members. Such rotation often occurs due to vibrations or other exterior influence in the unlocked and unloaded state of an over-center fastener, and may result in that a particular setting of the fastener for a particular clamping case may be lost. This, in turn, may result in that clamping becomes too loose or to tight, or, in case such condition is discovered at all, in a time consuming renewed setting.

SUMMARY OF THE INVENTION

Thus, the problem to be solved by the present invention, and that must have existed for at least a century, is to provide a means for retaining undesired relative rotation of the externally threaded stem and the internally threaded body of an over-center fastener.

According to the present invention this problem is solved by applying what is previously known from various lock nuts, viz., the use of a frictional insert, to an over-center fastener.

In practice, this may be accomplished by simply using a conventional lock nut as the internally threaded body, or, by providing the internally threaded body with a friction increasing insert.

In the lock nut case, in the first type of fastener, it is sufficient to cut a rectangular aperture through the body member extending at right angle to its rotational axis and at the same time at right angle to its through hole, which is no longer threaded but a smooth hole having an internal diameter slightly larger than the external diameter of the thread of the threaded stem member. The dimensions of the aperture are such that a nut is un-rotationally accommodated within it.

In the lock nut case, in the second type of fastener, there is provided a holder for a nut connected to the handle member to be rotatable about the second axis. The holder is formed from sheet metal to receive the nut in an unrotational manner.

In the friction increasing insert case, it is proposed still to use the prior art internally threaded body member, but to complete it with a friction increasing insert similarly to what is known from conventional lock nuts.

BRIEF DESCRIPTION OF THE DRAWING

Embodiments of the present invention will now be described, reference being made to the accompanying drawings, wherein.

DETAILED DESCRIPTION OF THE INVENTION

Figure 1:
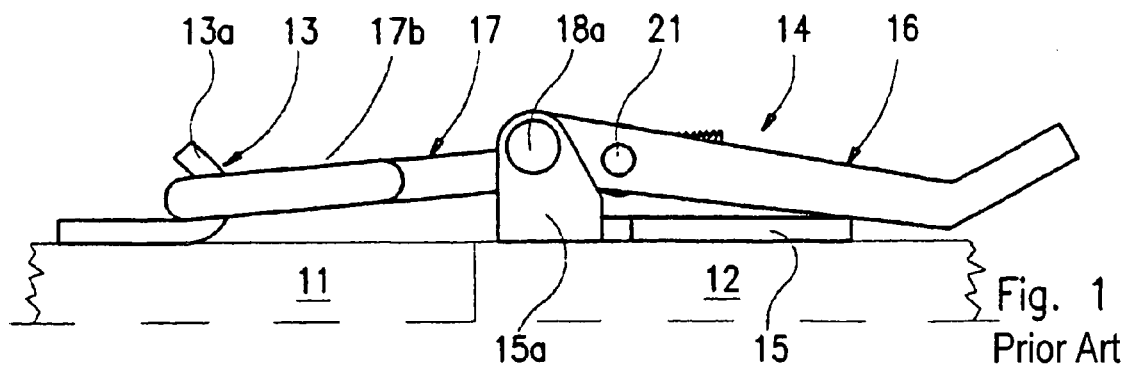
FIG. 1 is a side view of a state of art fastener of the first type.
Figure 2:
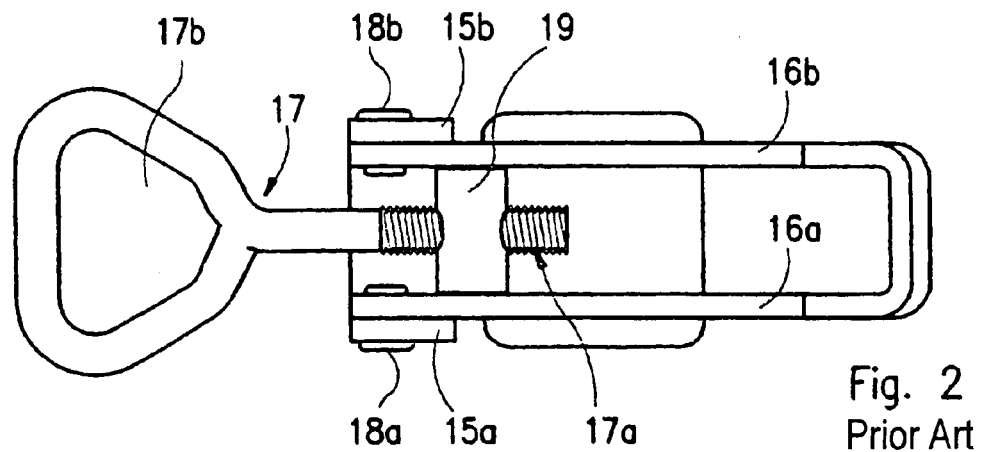
FIG. 2 is a plan view of the fastener of FIG. 1 shown without its associated striker.

The state of art fastener shown in FIGS. 1 and 2 is shown to connect and clamp together two separate pieces 11 and 12. It includes a first part 13—a striker—fixed to the first piece 11, and a second part 14 fixed to the second piece 12. The striker has a hook-like free end 13a. The second part comprises a base plate 15 fixed to the second piece 12, a lever 16 and an engagement member 17. The lever 16 is swingable about rivets 18a, 18b engaged in spaced brackets 15a, 15b protruding from the base plate 15. A first end 17a of the engagement member 17 is threaded and engages internal threads of a cylindrical body 19 which is linked to the lever 16 at a distance from the rivets 18a, 18b. More precisely, the cylindrical body 19 is carried between spaced legs 16a, 16b of the lever 16 so as to be rotational about stub shafts 21 engaged in the spaced legs. A free end of the engagement member 17 is formed with an eye 17b engaging the hook-like end 13a of the striker 13 in the locked position shown in FIG. 1. In the unclamped state of the engagement member, its threaded end is likely to disengage from the threads of the body 19 due to, for instance, vibrations. To overcome this risk, the present invention proposes to use a conventional lock nut, for instance of the kind having a friction increasing inlay at one end of its internal threads.

Figure 3:
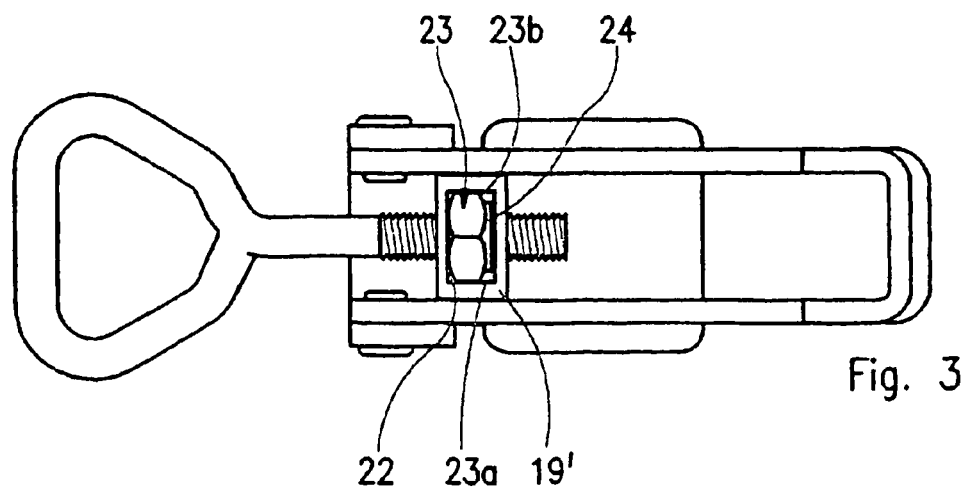
FIG. 3 is a plan view corresponding to FIG. 2 of a fastener provided with a lock nut according to the present invention.

FIG. 3 shows how this may be realized in a fastener of the kind shown in FIGS. 1 and 2. A rectangular aperture 22 is machined through the cylindrical body 19' and a lock nut 23, having a width between two of its opposed sides 23a, 23b slightly greater than the free width of the aperture 22, is introduced into the aperture. Thereafter, the threaded end 17a of the engagement member is threaded through the nut and a friction increasing inlay 24 provided at one of its ends. The internal threads of the cylindrical block may be maintained, although it is preferred not to have such threads in this case, since they may interfere with the threads of the nut when mounting the threaded end of the engagement member.

Figure 4:
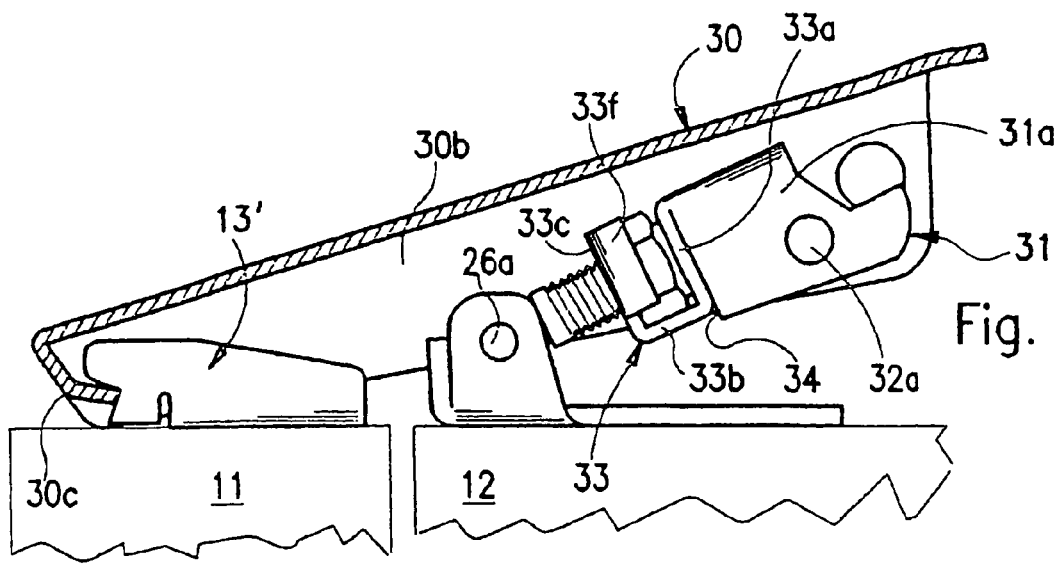
FIG. 4 is a part cross sectional side view of a fastener of the second type provided with a lock nut according to the present invention and shown in a partially open position.
Figure 5:
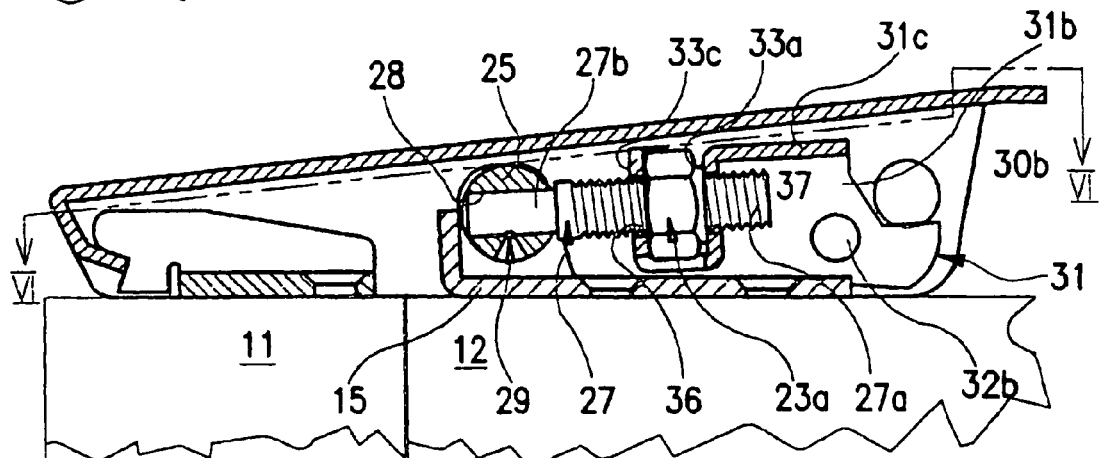
FIG. 5 is a cross sectional side view of the fastener of FIG. 4 in a locked position.
Figure 6:
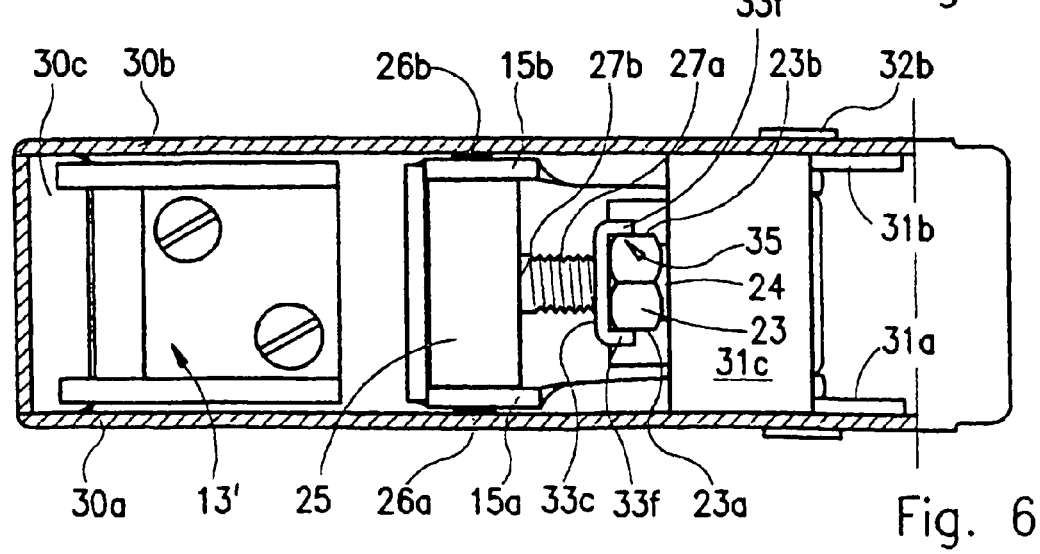
FIG. 6 is a plan sectional view taken along line VI—VI in FIG. 5.

The inventive idea applied to the second type of fastener is shown in FIGS. 4–6, wherein the same reference numerals are used as in FIGS. 1–3 for corresponding parts.

As in the previous embodiment, a first piece 11 is to be clamped to a second piece 12 (FIGS. 4 and 5) by means of a fastener. The fastener is shown in FIG. 4 to be in a partly open state and in FIG. 5 to be closed, having clamped the two pieces together. A striker 13' is attached to the first piece 11 and a base plate 15 is attached to the second piece 12. Again, the base plate has spaced brackets 15a, 15b. A cylindrical body 25 is rotatably carried between the brackets by means of stub shafts 26a, 26b engaged in a respective bracket. A stem 27 having threads 27a at one end has a reduced diameter opposed end 27b extending through a diametrically extending hole 28 through the cylindrical body 25. The stem end 27b is jolted at 29 so as to firmly keep the stem in relation to the hole 28 and the cylindrical body.

A handle member 30 of inverted U-shaped cross section has spaced flange portions 30a, 30b and a hooked forward end 30c for engagement with the striker 13'.

A bent sheet metal structure 31 has a generally inverted U-shaped portion including opposed flange portions 31a, 31b and a web portion 31c. The flange portions are linked to a respective flange portion 30a, 30b of the handle member 30 by means of rivets 32a, 32b, respectively. The web portion 31c carries an integral extension 33. A first portion 33a of the extension is bent at substantially 90° so as to extend along and abut a respective forwardly directed edge 34 of the flange portions 30a, 30b. A second portion 33b of the extension is bent at 90° in relation to the first portion, and a third portion 33c thereof is further bent at 90° in relation to the second one. Flap portions 33f originally extending in opposite directions from the third portion are bent towards the first portion 33a so as to be mutually parallel, thus forming a nut retaining pocket 35. The distance between the flap portions 33f is slightly greater than the width between opposed surfaces 23a, 23b of a lock nut 23 received within the pocket 35 so as to unrotationally keep the nut therein. Holes 36, 37 for the threaded portion 27a of the stem 27 are provided in the third and first portions 33c, 33a of the extension 33.

It will be realized that in operation of the fastener, the extension 33, and particularly its third portion 33c with its flap portions 33f, will be exposed to only minor stresses keeping the nut unrotational, whereas the clamping forces will be transferred from the stem 27 through the nut and into the first portion 33a of the extension, which abuts the edges 34, thus directing the clamping forces into the opposed flanges of the structure 31.

Figure 7:
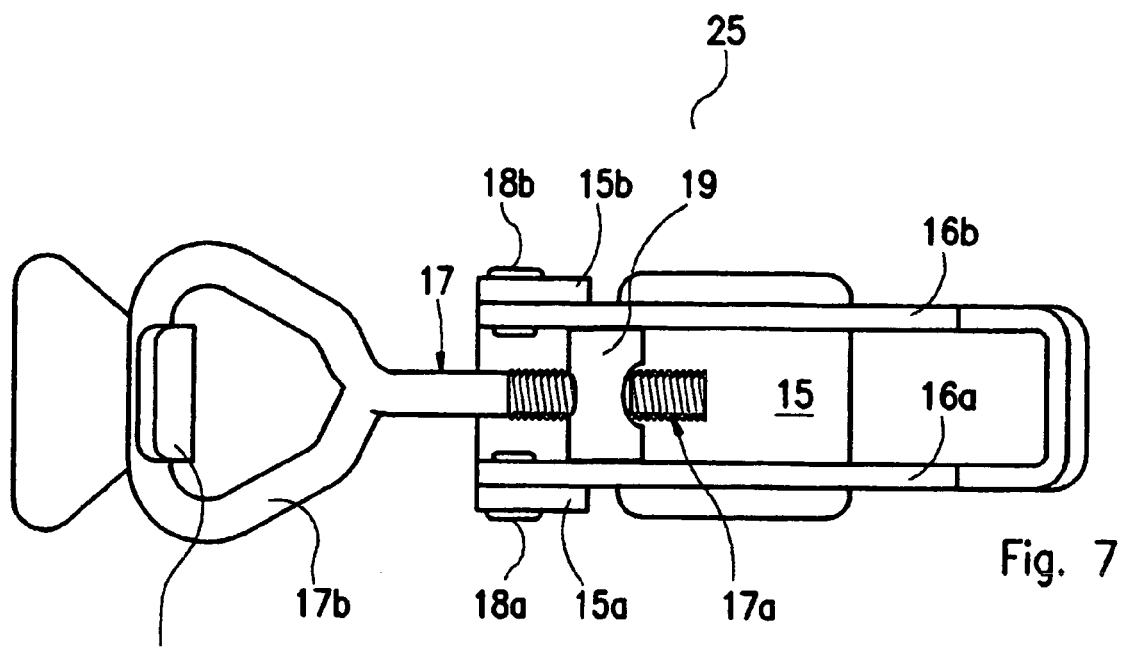
FIG. 7 is a plan view of a fastener similar to that according to FIGS. 1 and 2 provided with a cylindrical, internally threaded body having a friction increasing insert according to the present invention.
Figure 8:
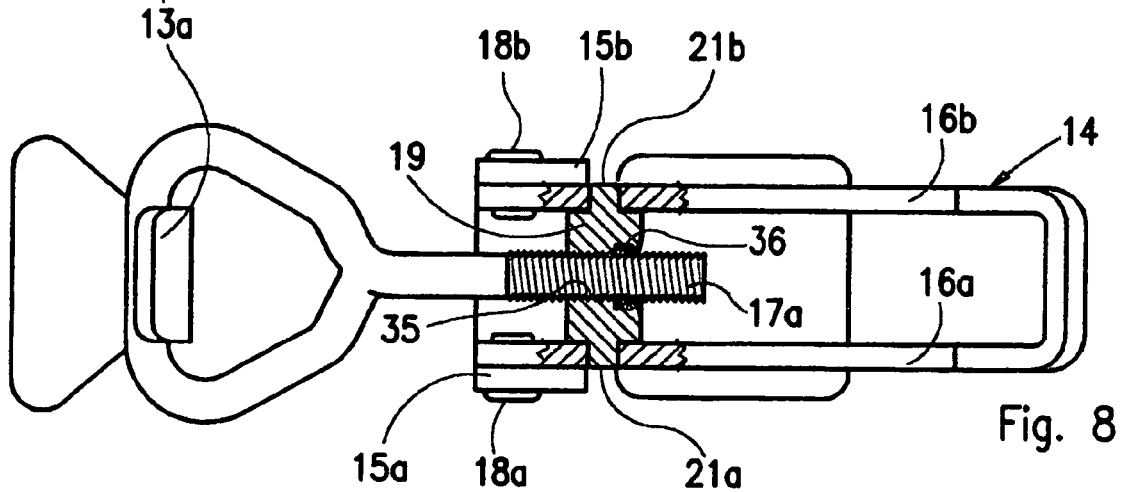
FIG. 8 is a view corresponding to FIG. 7 but showing the cylindrical body and portions of the lever sectioned.

In the embodiment of the present invention shown in FIGS. 7 and 8, the conventional, internally threaded body 19 is completed with a friction increasing insert resembling that of a conventional lock nut.

Figure 9:
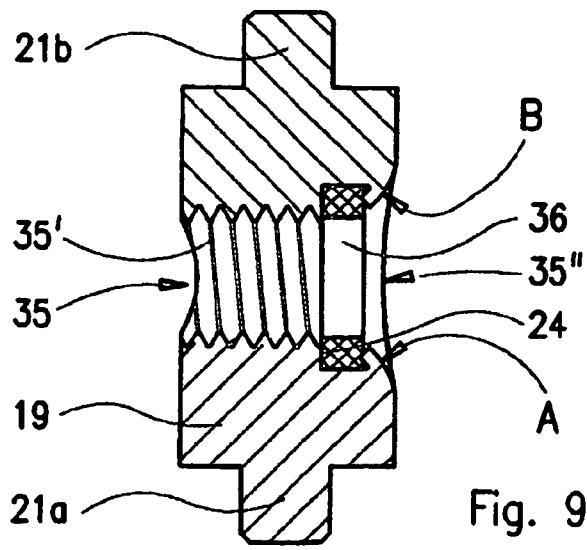
FIG. 9 is a section through the cylindrical body of FIG. 8 at an enlarged scale.
Figure 10:
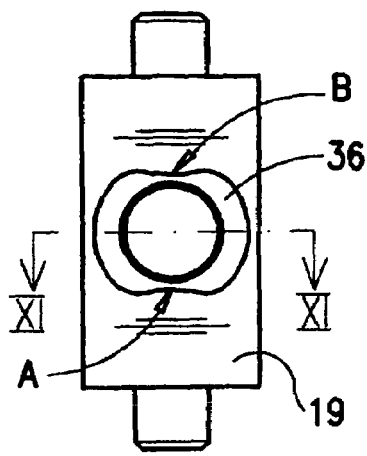
FIG. 10 is a view towards the side of the cylindrical body according to FIGS. 7–9 carrying the insert.

The enlarged section of FIG. 9 more clearly shows a diametrically extending hole 35 through the body 19 provided with its internal threads 35'. The hole has a widened diameter end portion 35" at one end, and a friction increasing insert 36 is received within that end portion so as to rest against a step 37. The edge of the widened end portion is upset at diametrically opposed locations A, B (FIG. 10) so as to positively keep the insert 36 in place. Like in a conventional lock nut, the internal diameter of the insert is smaller than the external diameter of the threaded end 17a of the engagement member 17. A preferred material of the insert is Nylon®.

Figure 12:
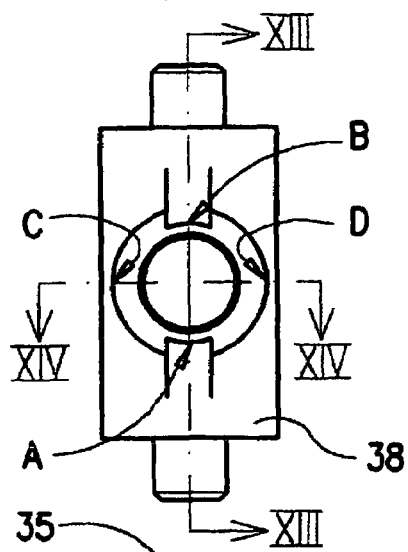
FIG. 12 is a view corresponding to that of FIG. 10 of an embodiment of internally threaded body having a square cross section.
Figure 13:
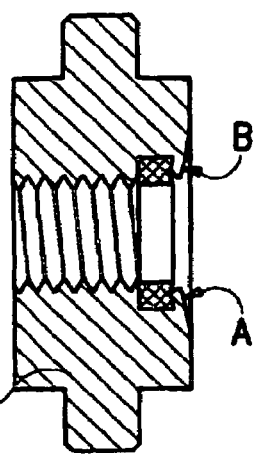
FIG. 13 is a section taken along line XIII—XIII in FIG. 12.
Figure 11:
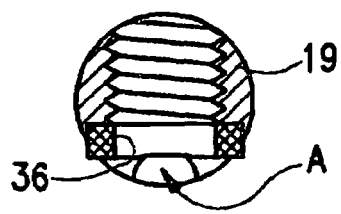
FIG. 11 is a section taken along line XI—XI in FIG. 10.
Figure 14:
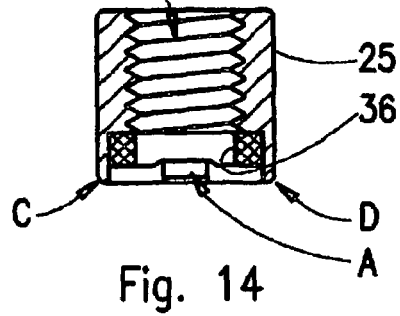
FIG. 14 is a section taken along line XIV—XIV in FIG. 12.
Figure 15:
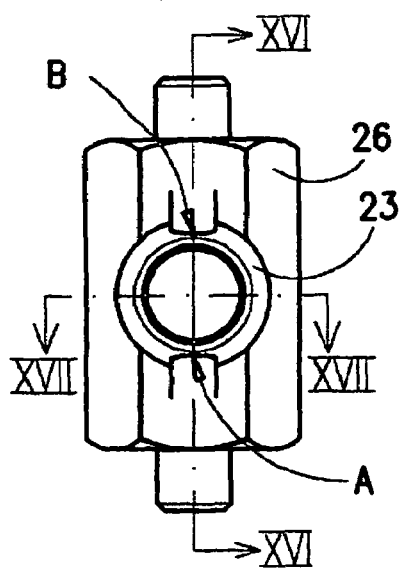
FIG. 15 is a view corresponding to that of FIGS. 10 and 12 of an embodiment of internally threaded body having a hexagonal cross section.
Figure 16:
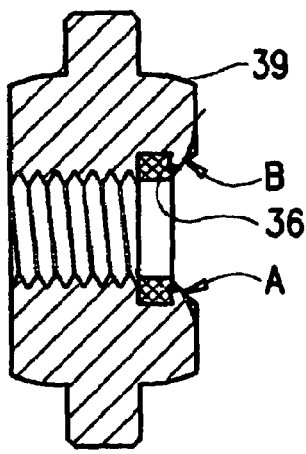
FIG. 16 is a section taken along line XVI—XVI in FIG. 15.
Figure 17:
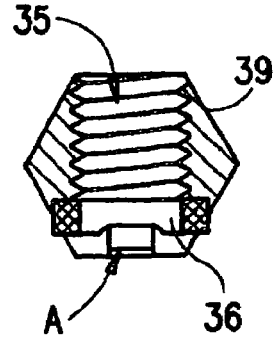
FIG. 17 is a section taken along line XVII—XVII in FIG. 15.

As one alternative to the cylindrical shape of the internally threaded body 19 it may be advantageous to provide an internally threaded body 38 having a substantially square cross section as shown in FIGS. 12–14, or to provide an internally threaded body 39 having a hexagonal cross sections as shown in FIGS. 15–17. Such cross sections provide the opportunity to make both ends of the hole 35 in flat opposed surfaces of the respective body. Also, a flat surface enables upsetting the edge of the widened portion of the hole 35 at more than the two diametrically opposed locations A and B shown in FIG. 12, viz. also at diametrically opposed locations C and D.

The invention claimed is:

1. A retainer for an adjustment device for an over-center fastener for securing and clamping two parts together by applying a pulling force between said two parts by a lever, said adjustment device comprising:

an externally threaded member and an internally threaded member rotatable relative to one another, said internally threaded member being a lock nut having a friction increasing insert and being unrotationally held by a structure movable with the lever, wherein said structure is a bent sheet metal structure having a generally inverted U-shaped portion including opposed flange portions and a web portion the flange portions being linked to a respective flange portion of the lever and the web portion carrying an integral extension, a first portion of said extension being bent at substantially 90° so as to extend along and abut a respective forwardly directed edge of the flange portions, a second portion of said extension being bent at 90° in relation to the first portion, and a third portion of said extension being further bent at 90° in relation to the second portion; flap portions originally extending in opposite directions from the third portion being bent towards the first portion so as to be mutually parallel, thus forming a nut retaining pocket.

2. The retainer according to claim 1, wherein a distance between the flap portions is slightly greater than a width between opposed surfaces of the lock nut received within the pocket so as to unrotationally keep the nut therein.

3. The retainer according to claim 1, further comprising:
holes for the threaded member provided in the third and first portions the extension.

4. The retainer according to claim 2, further comprising:
holes for the threaded member provided in the third and first portions of the extension.

* * * * *